United States Patent

Sato et al.

(10) Patent No.: US 10,698,172 B2
(45) Date of Patent: Jun. 30, 2020

(54) IMAGING MODULE AND METHOD OF MANUFACTURING THE SAME

(71) Applicants: Fujikura Ltd., Tokyo (JP); SEIKOH GIKEN Co., Ltd., Matsudo-shi, Chiba (JP)

(72) Inventors: Takao Sato, Sakura (JP); Takahiro Shimono, Sakura (JP); Tomomi Hirao, Matsudo (JP); Ryo Iijima, Matsudo (JP); Ryosuke Niwaki, Matsudo (JP)

(73) Assignees: FUJIKURA LTD., Tokyo (JP); SEIKOH GIKEN CO., LTD., Matsudo-shi, Chiba (JP)

( * ) Notice: Subject to any disclaimer, the term of this patent is extended or adjusted under 35 U.S.C. 154(b) by 104 days.

(21) Appl. No.: 15/703,074

(22) Filed: Sep. 13, 2017

(65) Prior Publication Data

US 2018/0081142 A1 Mar. 22, 2018

(30) Foreign Application Priority Data

Sep. 16, 2016 (JP) .................................. 2016-182372

(51) Int. Cl.
*G02B 7/02* (2006.01)
*G02B 5/00* (2006.01)
*G02B 27/00* (2006.01)

(52) U.S. Cl.
CPC ............. *G02B 7/022* (2013.01); *G02B 5/005* (2013.01); *G02B 7/025* (2013.01); *G02B 27/0018* (2013.01)

(58) Field of Classification Search
CPC .......... G02B 7/022; G02B 7/025; G02B 7/10; G02B 7/026; G02B 7/028; G02B 5/005; G02B 27/0018

USPC ................. 359/601, 611, 613, 614, 819, 830
See application file for complete search history.

(56) References Cited

U.S. PATENT DOCUMENTS

| 5,276,552 A * | 1/1994 | Kohmoto ................. G02B 7/10 |
| | | 359/601 |
| 5,400,072 A | 3/1995 | Izumi et al. |
| 6,967,796 B2 * | 11/2005 | Takeuchi ............. G02B 5/1814 |
| | | 359/576 |

(Continued)

FOREIGN PATENT DOCUMENTS

| JP | 63-111070 U | 7/1988 |
| JP | 2-106847 U | 8/1990 |

(Continued)

OTHER PUBLICATIONS

Office Action dated Jan. 9, 2018, issued in counterpart Japanese Application No. 2016-182372. (3 pages).

(Continued)

*Primary Examiner* — Collin X Beatty
(74) *Attorney, Agent, or Firm* — Westerman, Hattori, Daniels & Adrian, LLP

(57) ABSTRACT

An imaging module includes: an object lens; an image-sensing device; a holder that holds the object lens and the image-sensing device, the holder having a butt-contact portion with which the object lens is able to be brought into contact from an object side; and an aperture stop arranged closer to the object than the butt-contact portion, wherein an area that is to be light-shielded by an outer-periphery of the aperture stop is larger than an internal diameter of the butt-contact portion.

7 Claims, 4 Drawing Sheets

(56) References Cited

U.S. PATENT DOCUMENTS

| | | | |
|---|---|---|---|
| 7,057,683 B2 * | 6/2006 | Udaka | G02B 5/005 |
| | | | 348/E5.028 |
| 2005/0035421 A1 | 2/2005 | Kayanuma et al. | |
| 2005/0270403 A1 | 12/2005 | Adachi et al. | |
| 2006/0221469 A1 | 10/2006 | Ye | |
| 2008/0094497 A1 | 4/2008 | Ishimaru | |
| 2009/0086342 A1 | 4/2009 | Seki | |
| 2010/0053318 A1 | 3/2010 | Sasaki | |
| 2010/0176281 A1 | 7/2010 | Tomioka et al. | |
| 2013/0076971 A1 | 3/2013 | Nishimoto et al. | |

FOREIGN PATENT DOCUMENTS

| | | |
|---|---|---|
| JP | 3-30581 A | 2/1991 |
| JP | 2000-139821 A | 5/2000 |
| JP | 2001-245186 A | 9/2001 |
| JP | 2004-147032 A | 5/2004 |
| JP | 2005-64591 A | 3/2005 |
| JP | 2006-284788 A | 10/2006 |
| JP | 2007-208793 A | 8/2007 |
| JP | 2008-104133 A | 5/2008 |
| JP | 2009-37009 A | 2/2009 |
| JP | 2009-104100 A | 5/2009 |
| JP | 2009-169147 A | 7/2009 |
| JP | 2010-56292 A | 3/2010 |
| JP | 2010-164755 A | 7/2010 |
| JP | 2013-68857 A | 4/2013 |
| JP | 2013-535708 A | 9/2013 |
| WO | 2007/099845 A1 | 9/2007 |
| WO | 2012/022000 A1 | 2/2012 |

OTHER PUBLICATIONS

Office Action dated Sep. 19, 2017, issued in counterpart Japanese Application No. 2016-182372. (6 pages).

Office Action dated Dec. 21, 2018, issued in counterpart Japanese Application No. 2018-042420. (4 pages).

* cited by examiner

IMAGING MODULE AND METHOD OF MANUFACTURING THE SAME

CROSS REFERENCE TO RELATED APPLICATIONS

This application claims priority from Japanese Patent Application No. 2016-182372 filed on Sep. 16, 2016, the contents of which are incorporated herein by reference in their entirety.

BACKGROUND OF THE INVENTION

Field of the Invention

The present invention relates to an imaging module and a method of manufacturing an imaging module.

Description of the Related Art

As a document disclosing prevention of ghost or flare due to stray light from being generated, for example, the following documents are known.

Japanese Unexamined Patent Application, First Publication No. 2010-164755 (hereinbelow, referred to as Patent Document 1) discloses an optical device in which, at least part thereof in the thickness direction of the outer peripheral face or at least part thereof in a circumferential direction is a non-parallel surface inclined with respect to an imaging optical axis so that the light beam, which is incident to a surface close to an object, reflected at a surface close to an imaging surface, incident to an outer peripheral face, and reflected at the outer peripheral face, is not incident to the imaging surface.

Japanese Unexamined Patent Application, First Publication No. 2013-68857 (hereinbelow, referred to as Patent Document 2) discloses an optical device including a flange having inclination that is not perpendicular to an optical axis direction in a side surface around an effective diameter area.

In the configuration disclosed in Patent Document 1, stray light generated from boundary face between lenses is directly incident to an image-sensing device.

In an image-sensing device for medical use, the front-end side (close to an object) of an object lens is preferably flat; however, also in this case, it is not certain whether or not the effect attempted to be achieved by Patent Document 1 can be realized.

Furthermore, in Patent Document 1, an aperture stop is inserted to a lens barrel from an object side, and a lens and a presser ring are inserted to a lens barrel from image side.

Accordingly, Patent Document 1 has a disadvantage in terms of increase in the number of steps of assembling the lens unit.

In the configuration disclosed in Patent Document 2, stray light is blocked by providing a light shielding component different from a lens barrel between lenses.

For this reason, it is not possible to block stray light passing through the outer-periphery of the light shielding component (between the light shielding component and the lens barrel).

Furthermore, due to addition of the light shielding component, the cost increases in terms of the cost of components, the number of assembly steps, and process yield.

In an image-sensing device for medical use, the front-end side (close to an object) of an object lens is preferably flat; however, also in this case, it is not certain whether or not the effect attempted to be achieved by Patent Document 2 can be realized.

SUMMARY OF THE INVENTION

One aspect of the invention was conceived in view of the above-described conventional circumstances and has an object thereof to provide an imaging module that easily reduces stray light that causes ghost or flare even in the case where the imaging module has a small diameter and a low height, and a method of manufacturing the imaging module.

In order to solve the problems, an imaging module according to a first aspect of the invention includes: an object lens; an image-sensing device; a holder that holds the object lens and the image-sensing device, the holder having a butt-contact portion with which the object lens is able to be brought into contact from an object side; and an aperture stop arranged closer to the object than the butt-contact portion, wherein an area that is to be light-shielded by an outer-periphery of the aperture stop is larger than an internal diameter of the butt-contact portion.

In the first aspect of the invention, the holder may have a configuration that is located between the object lens and the image-sensing device on an inner surface portion that is in contact with a space in which a lens is not arranged, and is inclined toward the image-sensing device or has a cross-sectional area which is increased stepwise.

In order to solve the problems, an imaging module according to a second aspect of the invention includes: an object lens; an image-sensing device; and a holder that holds the object lens and the image-sensing device, the holder having a configuration that is located between the object lens and the image-sensing device on an inner surface portion that is in contact with a space in which a lens is not arranged, and is inclined toward the image-sensing device or has a cross-sectional area which is increased stepwise.

In the first aspect and the second aspect of the invention, the object side of the object lens may have a flat surface.

In order to solve the problems, a method according to a third aspect of the invention manufactures an imaging module that includes: an object lens; an image-sensing device; a holder that holds the object lens and the image-sensing device, the holder having a butt-contact portion with which the object lens is able to be brought into contact from an object side; and an aperture stop arranged closer to the object than the butt-contact portion, wherein an area that is to be light-shielded by an outer-periphery of the aperture stop is larger than an internal diameter of the butt-contact portion. The method includes inserting a lens cover only through a portion closer to an object than the butt-contact portion, the lens cover covering the object lens, the aperture stop, and an object side of the object lens.

In the third aspect of the invention, the holder may have a configuration that is located between the object lens and the image-sensing device on an inner surface portion that is in contact with a space in which a lens is not arranged, and is inclined toward the image-sensing device or has a cross-sectional area which is increased stepwise.

In the third aspect of the invention, the object side of the object lens may have a flat surface.

Effects of the Invention

According to the above-described aspects, since the area that is to be light-shielded by the outer-periphery of the aperture stop arranged closer to the object than the butt-contact portion of the holder is larger than an internal diameter of the butt-contact portion or since the holder has a configuration that is located between the object lens and the image-sensing device on an inner surface portion that is in contact with a space in which a lens is not arranged and is inclined toward the image-sensing device or has a cross-sectional area which is increased stepwise, it is possible to reduce stray light that causes ghost or flare even in the case where the imaging module has a small diameter and a low height.

DETAILED DESCRIPTION OF THE INVENTION

Hereinafter, preferred embodiments of the invention will be described with reference to drawings.

In the description, the XY-directions mean the direction perpendicular to an optical axis, and the Z-direction means the optical axis direction.

Of the XY-directions, the direction along the radius in a circle centered on the optical axis may be referred to as a radial direction.

In the description, the X-direction and the Y-direction are not particularly defined. Two directions orthogonal to each other in the XY-directions can be optionally selected.

Figure 1:
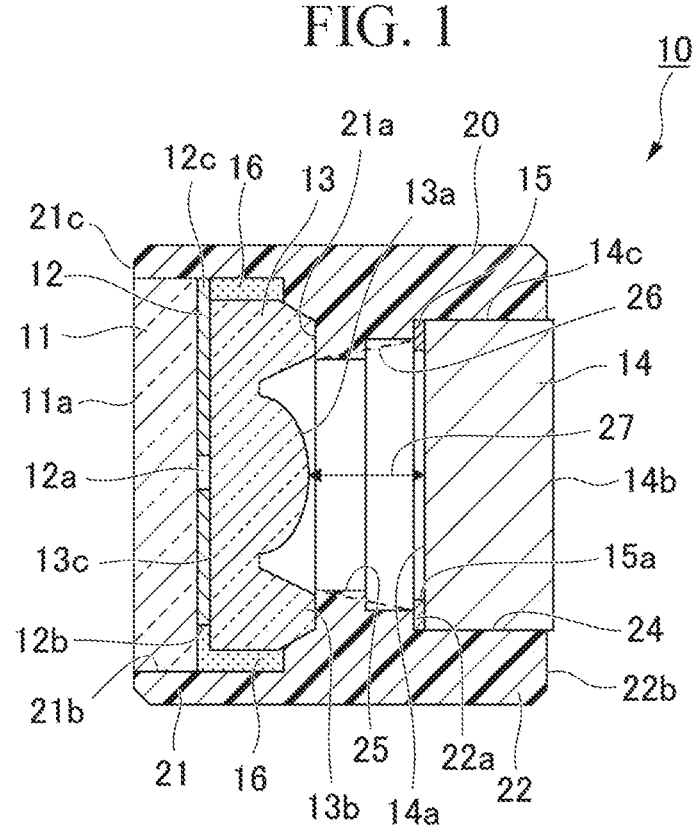
FIG. 1 is a cross-sectional view showing an imaging module according to a first embodiment.

FIG. 1 is a cross-sectional view showing an imaging module 10 according to the first embodiment.

The imaging module 10 includes an object lens 13, an image-sensing device 14, and a holder 20.

Regarding the dimensions of the holder 20, the diameter thereof is less than or equal to, for example, 10 mm, particularly, the range of approximately 1 to 5 mm is adopted for example, and the length thereof in axis (from the front end 21c to the rear end 22b) is less than or equal to, for example, 10 mm, particularly, the range of approximately 1 to 5 mm is adopted for example.

The diameter and the length in axis may be less than or equal to 2 mm.

The holder 20 includes: a lens holder 21 that holds the object lens 13; and an image-sensing device holder 22 that holds the image-sensing device 14.

By this structure, it is possible to hold the object lens 13 and the image-sensing device 14 by the holder 20 in which the lens holder and the image-sensing device holder are integrated in one body.

As a material used to form the holder 20, plastic, ceramics, metal, or the like may be adopted.

Among those, plastic is preferable which can be easily molded with a high degree of accuracy.

It is preferable that the holder 20 have a light shielding property.

The object lens 13 includes: a lens portion 13a located on an optical axis; and an external ring 13b provided on the outer-periphery of the lens portion 13a.

The surface of the object lens 13 close to the object has a flat surface 13c.

Since each of an aperture stop 12 and a lens cover 11 has a flat surface, it is possible to easily match the surfaces of the object lens 13, the aperture stop 12, and the lens cover 11.

Furthermore, the holder 20 includes a lens-butt-contact portion 21a that serves as a butt-contact portion that can be brought into contact with the object lens 13 (particularly, the external ring 13b) from an object side.

Consequently, it is easy to position the object lens 13 with respect to the holder 20 in the Z-direction.

The aperture stop 12 is disposed at the position closer to the object than the lens-butt-contact portion 21a.

The aperture stop 12 is formed of a metal plate, for example, SUS or the like and can shield light at the periphery of an opening 12a.

A cut-off portion 12b may be formed on at part of the outer periphery 12c of the aperture stop 12 in the circumferential direction thereof.

For this reason, even in the case where the outer periphery 12c of the aperture stop 12 comes into contact with the inner surface portion 21b of the lens holder 21 and a light shielding area widens, it is easy to handle the aperture stop 12.

In the imaging module 10 according to the embodiment, the area that is to be light-shielded by the outer periphery 12c of the aperture stop 12 is larger than the internal diameter of the lens-butt-contact portion 21a.

Accordingly, even in the case where external light passes through between the outer periphery 12c of the aperture stop 12 and the inner surface portion 21b of the lens holder 21 and stray light thereby occurs, it is possible to block the stray light by the lens-butt-contact portion 21a.

That is, the region of light that enters the image-sensing device 14 from the outside through the object lens 13 is limited by the aperture portion 25 formed of the internal diameter of the lens-butt-contact portion 21a.

Because of this, it is possible to prevent generation of flare or ghost due to stray light, which is caused by external light that is incident to the device through the portion which is not the opening 12a of the aperture stop 12.

The lens holder 21 of the holder 20 can accommodate the lens cover 11 therein in addition to the object lens 13 and the aperture stop 12.

In order to prevent the length of the imaging module 10 in the Z-direction from increasing and prevent extraneous materials from being adhered to the imaging module, a step difference is preferably not formed between the front-end face 11a of the lens cover 11 and the front end 21c of the lens holder 21 as possible.

The front-end face 11a of the lens cover 11 is flat. Even in the case where the imaging module 10 is used in fluid such as water or used in air, the imaging module is not influenced by variation in a refractive index of surrounding medium and can form an image.

Therefore, the imaging module can be easily used both in fluid such has liquid body and gaseous matter such as gas and is preferably used for medical use.

It is preferable that a material used to form the lens cover 11 be a biomaterial such as glass.

In the description, the lens cover 11, the aperture stop 12, and the object lens 13 may be collectively referred to as "object-side members 11 to 13".

An adhesive 16 is provided between the inner surface portion 21b of the lens holder 21 and the outer peripheries of the object-side members 11 to 13.

By this structure, it is possible to fix the object-side members 11 to 13 to the lens holder 21 of the holder 20, and it is also possible to provide airtightness.

Since the lens-butt-contact portion 21a has the configuration capable of positioning the object lens 13 (particularly, the external ring 13b) in the XY-directions, the alignment in XY-directions can be easily carried out only by inserting the object lens 13 to the lens-butt-contact portion 21a.

The holder 20 has a configuration (diameter-increasing portion 26 in the embodiment) that is located between the object lens 13 and the image-sensing device 14 on an inner surface portion that is in contact with a space 27 in which a lens is not arranged, and is inclined toward the image-sensing device 14 or has a cross-sectional area which is increased stepwise.

Accordingly, even in the case where part of light incident to the image-sensing device 14 is reflected by a top surface 14a of the image-sensing device 14, when the reflected light enters the diameter-increasing portion 26 and the aperture portion 25, due to control of the reflection direction, diffusion or absorption of the reflected light, or the like, it is possible to prevent the light from re-entering the image-sensing device 14.

Because of this, it is possible to prevent generation of flare or ghost due to stray light, which is caused by the reflected light.

The diameter-increasing portion 26 may be a cylindrical surface having the internal diameter larger than that of the aperture portion 25 or a tapered surface such that the diameter thereof increases in a direction toward the image-sensing device 14.

Figure 2:
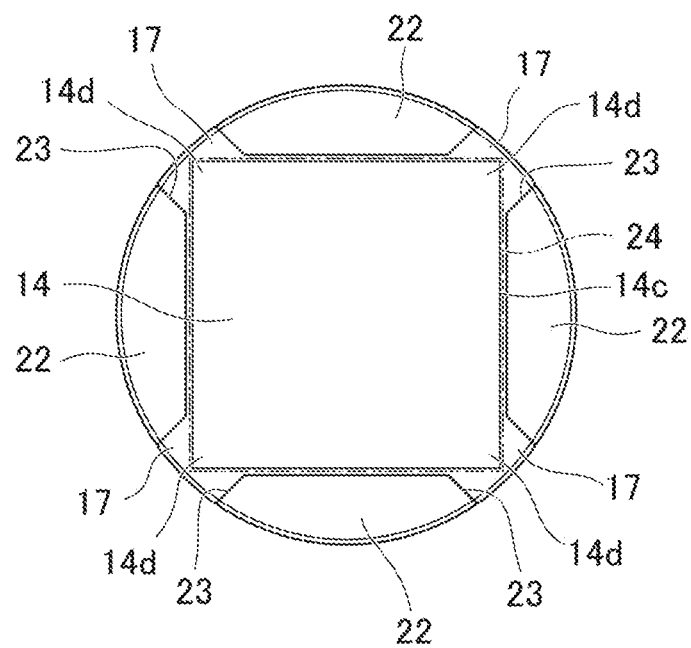
FIG. 2 is a side view showing an example of an image-sensing device of the imaging module.
Figure 3:
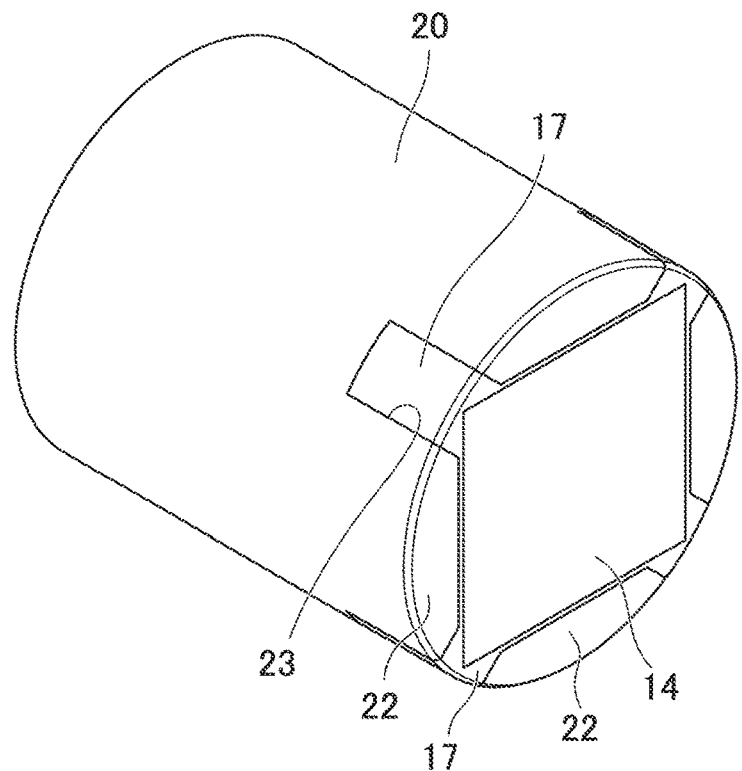
FIG. 3 is a perspective view showing an example of an external appearance of the imaging module.

FIGS. 2 and 3 show an external appearance of the image-sensing device of the imaging module 10.

As the image-sensing device 14, a solid-state image sensing device is adopted such as CMOS, CCD.

The image-sensing device 14 has the top surface 14a and a back surface 14b which is on both surfaces in the Z-direction and has side surfaces 14c on the periphery of the image-sensing device 14 in the XY-directions.

The image-sensing device 14 has an image-sensing area (not shown in the figure) that is provided on the top surface 14a of the image-sensing device 14 and serves as a light receiving portion of the image-sensing device 14.

The image-sensing area is an area that obtains an image signal from external light and has, for example, a photoelectric converter.

Part of or all of area of the top surface 14a of the image-sensing device 14 has a light-transmissive region through which external light can reach the image-sensing area.

A light transmissive protective layer such as a cover glass may be provided on the top surface 14a of the image-sensing device 14 in order to protect the image-sensing area.

The top surface 14a (a cover glass or the like) may be subjected to an anti-reflective treatment or may have an anti-reflective layer provided thereon. The case of omitting an anti-reflective treatment or an anti-reflective layer is preferable in terms of low-cost.

The back surface 14b of the image-sensing device 14 is exposed at the rear end 22b of the image-sensing device holder 22.

A flexible wiring substrate, an electrical cable, or the like may be connected to the back surface 14b.

The back surface 14b of the image-sensing device 14 and the rear end 22b of the image-sensing device holder 22 may be on substantially the same plane. The back surface 14b may protrude rearward from the rear end 22b.

The image-sensing device holder 22 of the holder 20 has slits 23 having a configuration that penetrates through the image-sensing device holder 22 in a radial direction from the inner face side of the holder 20 toward the outer face side thereof.

The slits 23 are provided at positions at which corners 14d on the side surfaces 14c of the image-sensing device 14 are disposed, and the corners protrude toward a direction perpendicular to the optical axis.

By this structure, the outer diameter of the holder 20 can be substantially the same as or less than the length between two corners on the diagonal line, which is the longest part of the image-sensing device 14 in the XY-directions.

The outer diameter of the holder 20 is minimized with respect to the dimension of the image-sensing device 14, and reduction in diameter of the imaging module 10 can be realized.

The image-sensing device holder 22 of the holder 20 has an inner frame 24 formed in a shape along the side surfaces 14c of the image-sensing device 14.

It is possible to position the image-sensing device 14 in the XY-directions only by fitting the side surfaces 14c of the image-sensing device 14 into the inner frame 24.

Accordingly, alignment of the image-sensing device in the XY-directions can be easily carried out only by inserting the image-sensing device 14 into the image-sensing device holder 22.

In the case where the holder 20 is made of plastic (resin), since the inner frame 24 is separated by the slits 23 in the circumferential direction, the durability against an external force (a stress generated inside the inner frame 24) acting toward the side surfaces 14c in the horizontal direction is significantly improved.

The space between the side surfaces 14c of the image-sensing device 14 and the inner frame 24 of the holder 20 is filled with an adhesive 17.

The slits 23 may be filled with the adhesive 17.

In this way, it is possible to easily fix the image-sensing device 14 to the holder 20.

In order to prevent leakage light from entering the inside of the holder through the slits 23, a material used to form the adhesive 17 is preferably a material having a light shielding property.

Furthermore, the holder 20 includes an image-sensing device butt-contact portion 22a that serves as a butt-contact portion that can be brought into contact with the image-sensing device 14 (particularly, the top surface 14a) in the Z-direction.

Consequently, it is easy to position the image-sensing device 14 with respect to the holder 20 in the Z-direction.

Since the adhesive 17 that is used to fix the image-sensing device 14 to the holder 20 does not leak out in the inside of the image-sensing device butt-contact portion 22a in the radial-inner direction, it is possible to prevent the adhesive 17 from leaking toward the image-sensing area.

Particularly, when the image-sensing device butt-contact portion 22a is brought into contact with the image-sensing device 14, a spacer 15 or the adhesive 17 may be interposed between the image-sensing device butt-contact portion 22a and the image-sensing device 14, or the image-sensing device 14 may be directly in contact with the image-sensing device butt-contact portion 22a without the spacer 15.

In the embodiment, the spacer 15 is provided between the top surface 14a of the image-sensing device 14 and the image-sensing device butt-contact portion 22a.

The spacer 15 is formed in an annular shape and has an opening 15a including at least a region of the image-sensing area (imaging surface) of the top surface 14a of the image-sensing device 14.

The spacer 15 may have an elasticity, shock-absorbing characteristics, or the like in order to limit a mechanical effect with respect to the top surface 14a of the image-sensing device 14.

The spacer 15 preferably has a light shielding property, and is made of, for example, a metal material.

In the production of object lenses, manufacturing is controlled for each production lot; however, there is a possibility that focal lengths of object lenses 13 vary due to variations in finished state of the object lenses 13 (or a lens unit 33 according to a second embodiment which will be described later) between production lots. In such case, it is possible to cancel the variation in the focal length by adjusting the thickness or the number of the spacer 15 (it is acceptable that the number is zero).

Furthermore, by providing a light shielding property to the spacer 15, it is possible to absorb unintentional light beam even in the case where stray light enters the outside of the opening 15a.

Figure 4:
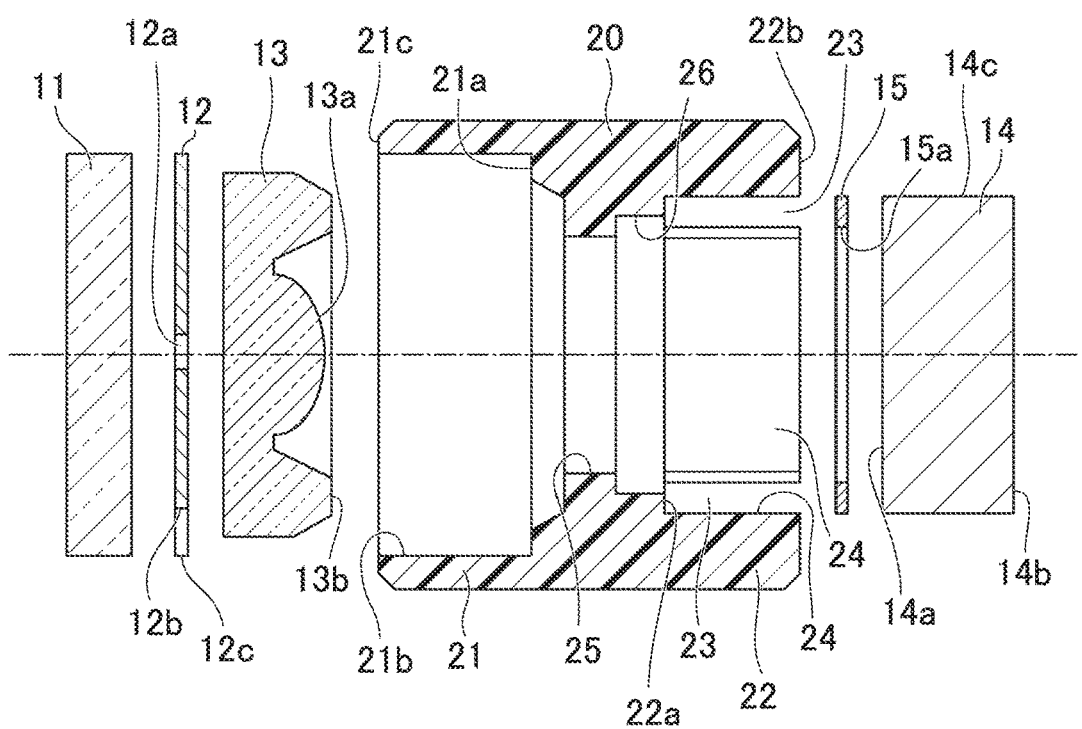
FIG. 4 is a cross-sectional view showing the imaging module according to the first embodiment in a disassembled state.

FIG. 4 shows the imaging module 10 in a disassembled state.

As a method of assembling the imaging module 10, a method is adopted which includes: a step of molding the holder 20 having the lens holder 21 and the image-sensing device holder 22; a step of inserting the object-side members 11 to 13 through the front end 21c of the lens holder 21 into the inside of the holder; and a step of inserting the image-sensing device 14 through the rear end 22b of the image-sensing device holder 22 into the inside of the holder.

The order of carrying out the step of inserting the object-side members 11 to 13 into the lens holder 21 and the step of inserting the image-sensing device 14 into the image-sensing device holder 22 are not particularly limited. The step of inserting the object-side members 11 to 13 into the lens holder 21 may be carried out before the step of inserting the image-sensing device 14 into the image-sensing device holder 22. The step of inserting the object-side members 11 to 13 into the lens holder 21 may be carried out after the step of inserting the image-sensing device 14 into the image-sensing device holder 22.

The step of inserting the object-side members 11 to 13 into the lens holder 21 is carried out such that the object lens 13, the aperture stop 12, and the lens cover 11 are sequentially inserted in this order only through a portion closer to the object than the lens-butt-contact portion 21a.

Accordingly, it is possible to reduce the number of assembly steps.

In the step of inserting the image-sensing device 14 into the image-sensing device holder 22, by matching the corners 14d of the image-sensing device 14 to the positions of the slits 23, it is possible to visually check the positions of the corners 14d, the corners 14d are avoided from cracking when inserting the image-sensing device into image-sensing device holder, and the insertion of the image-sensing device into the holder can be easily carried out.

Figure 5:
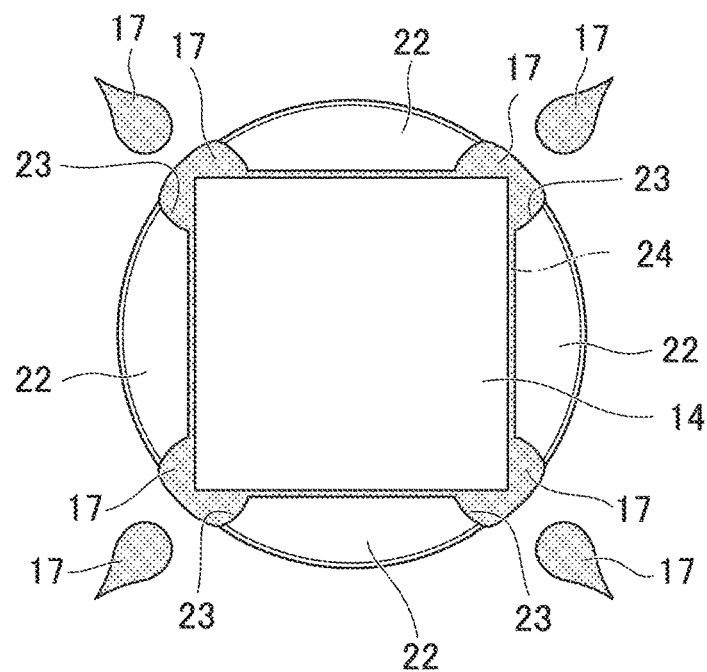
FIG. 5 is a side view showing an example of a method of adhesively-fixing an image-sensing device to a holder.

Moreover, as shown in FIG. 5, it is possible to inject the adhesive 17 from the outside of the image-sensing device holder 22 in the radial direction to the slits 23.

As a method of manufacturing an imaging module, the following steps are adopted: the adhesive 16 is applied to the lens holder 21 of the holder 20; thereafter, the object-side members 11 to 13 are sequentially inserted into the lens holder 21; furthermore, the image-sensing device 14 is inserted into the image-sensing device holder 22; and thereafter, the adhesive 17 is injected to the side surfaces 14c of the image-sensing device 14 through the slits 23.

Since the object lens 13 and the image-sensing device 14 are fixed in position to the lens holder 21 and the image-sensing device holder 22 in the XY-directions and the Z-direction, respectively, alignment can be easily carried out only by the steps of butt-contacting the object lens and the image-sensing device to the holder, and it is possible to significantly reduce fabrication tolerance.

As compared with the case where the image-sensing device 14 is inserted into the holder after applying an adhesive to the inner surface of the image-sensing device holder 22, in the case of the embodiment, in a state where the image-sensing device 14 is inserted into the image-sensing device holder 22 and the image-sensing device 14 is brought into contact with the image-sensing device butt-contact portion 22a, the adhesive 17 is injected to the side surfaces and the image-sensing device 14 is thereby fixed in position. According to the embodiment, the adhesive 17 is less likely to leak onto the top surface 14a of the image-sensing device 14, and it is also possible to reduce error in the Z-direction due to variation in thickness of the adhesive 17 adhered to the top surface 14a of the image-sensing device 14.

Figure 6:
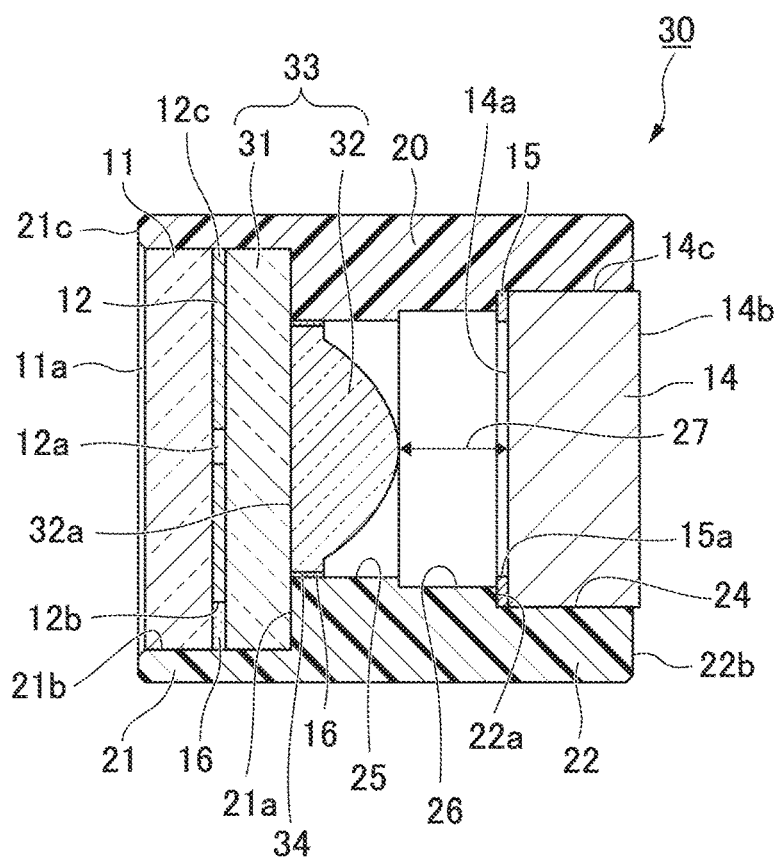
FIG. 6 is a cross-sectional view showing an imaging module according to a second embodiment.

FIG. 6 is a cross-sectional view showing an imaging module 30 according to a second embodiment.

Figure 7:
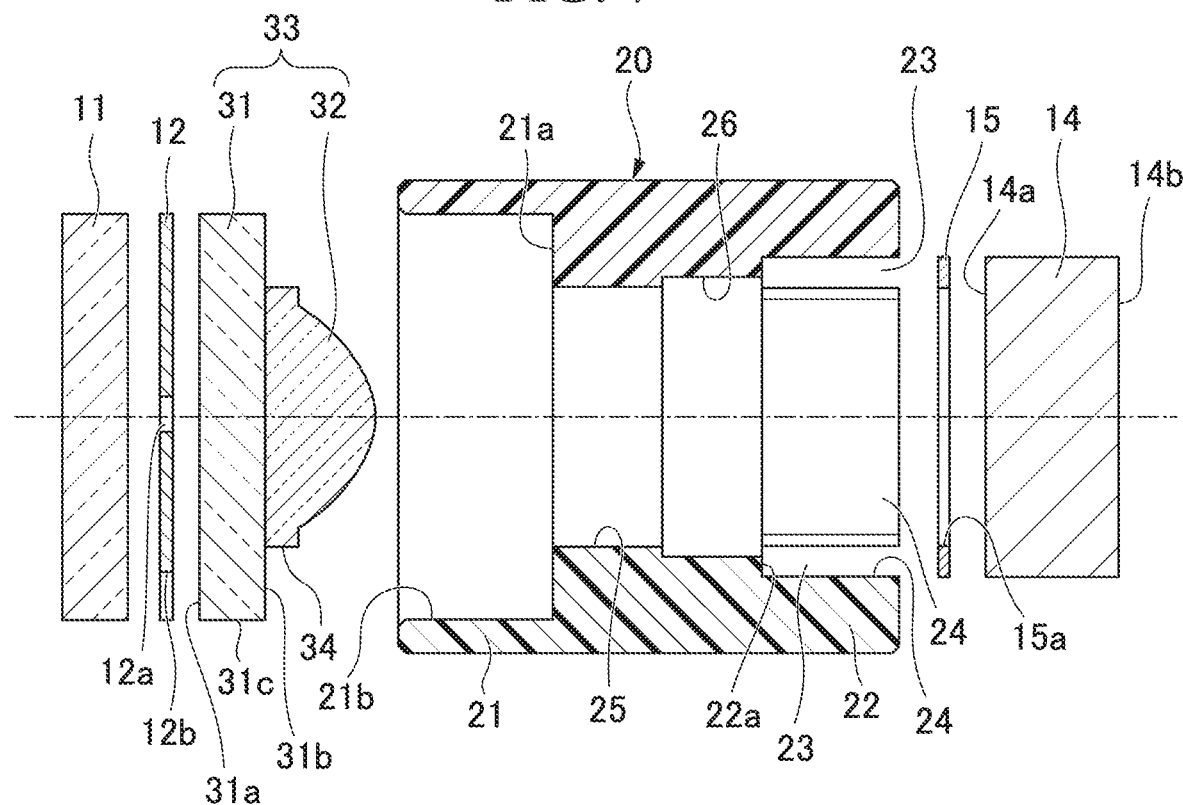
FIG. 7 is a cross-sectional view showing the imaging module according to the second embodiment in a disassembled state.

FIG. 7 shows the imaging module 30 in a disassembled state.

The imaging module 30 according to the embodiment has substantially the same configuration as that of the imaging module 10 according to the first embodiment, with the exception that a lens unit 33 is used instead of the object lens 13 according to the first embodiment.

Identical reference numerals are used for the elements which are identical to those of the first embodiment, and the explanations thereof are omitted or simplified here.

FIGS. 2, 3, and 5 are commonly applicable to the second embodiment.

In the configuration according to the embodiment, the lens cover 11, the aperture stop 12, and the lens unit 33 correspond to the object-side members 11 to 13 according to the first embodiment, respectively.

The lens unit 33 has a structure including: a support plate 31; and an object lens 32 fixed to a main surface 31b on one side of the support plate.

The surface of the object lens 32 close to the object has a flat surface 32a that is in contact with the support plate 31.

A top surface 32b of the object lens 32 has a curved surface.

The support plate 31 is, for example, a glass flat plate, and the main surfaces 31a and 31b on both sides thereof in the Z-direction are each a flat surface.

The object lens 32 is, for example, a plastic (resin) lens.

The lens-butt-contact portion 21a is a flat surface perpendicular to an optical axis. When the support plate 31 comes into contact with the lens-butt-contact portion 21a, the butt-contact of the lens unit 33 is brought into contact with the lens-butt-contact portion 21a.

Accordingly, alignment of the object lens 32 with respect to the holder 20 in the Z-direction can be easily carried out.

As the side surface 31c of the support plate 31 is fitted onto the inner surface portion 21b of the lens holder 21, the support plate can be fixed in position in the XY-directions.

As a result, the alignment in XY-directions can be easily carried out only by inserting the lens unit 33 to the lens-butt-contact portion 21a.

A wall 34 is provided on the outer periphery of the object lens 32, and the wall maintains a gap between the wall and the inner surface (particularly, an inner surface of the aperture portion 25) of the holder 20.

Figure 8:
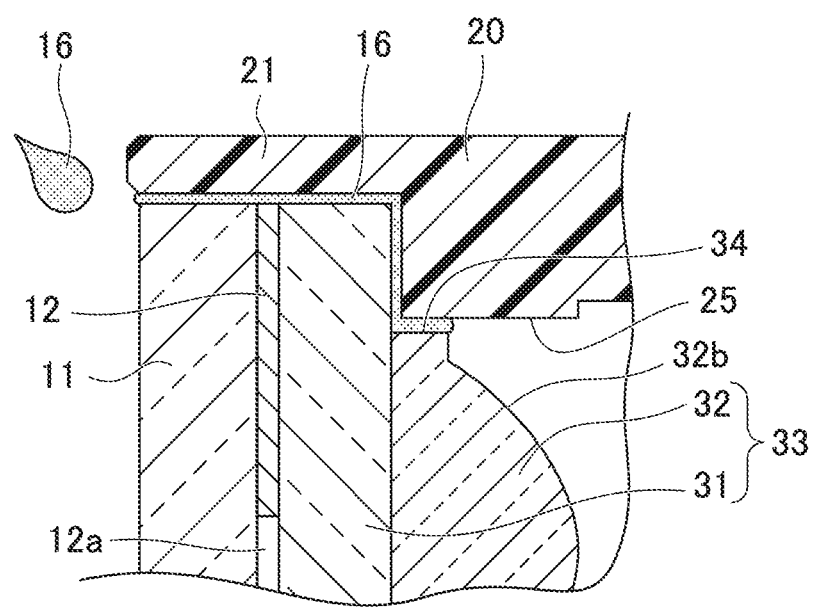
FIG. 8 is a cross-sectional view partially showing a method of adhesively-fixing a lens unit to a holder.

When the lens unit 33 is adhesively-fixed to the lens holder 21, since the adhesive 17 accumulates in the gap facing the wall 34 as shown in FIG. 8, it is possible to prevent the adhesive 17 from spreading on the top surface 32b of the object lens 32.

As described above, in the imaging modules 10 and 30 according to the aforementioned embodiment, since fixation or positioning of the image-sensing device 14 with respect to the holder 20 becomes easy, it is easy to reduce the imaging modules 10 and 30 in diameter.

Since the image-sensing device 14 is directly fixed in position to the holder 20, it is possible to prevent an error due to axis deviation from occurring.

Furthermore, since the object-side members 11 to 13 or the lens unit 33 are inserted into the lens holder only through the object side of the holder 20, it is possible to reduce the number of assembly steps.

Also, since fixation or positioning of the object lenses 13 and 32 with respect to the holder 20 becomes easy, it is easy to reduce the imaging modules 10 and 30 in diameter.

Additionally, flare or ghost due to stray light is prevented from occurring by the lens-butt-contact portion 21a (the aperture portion 25) and the diameter-increasing portion 26, and it is possible to limit reduction in contrast.

By use of a lens unit having a small diameter and a low height, it is possible to prevent generation of flare or ghost. Since a complicated structure is not necessary and the large number of parts is not required, the cost of components and the number of assembly steps are reduced, process yield is improved, and it is possible to decrease the cost of the imaging modules 10 and 30.

While preferred embodiments of the invention have been described and shown above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

In the above-described embodiments, the case where the object lenses 13 and 32 are each formed of one lens is explained for example. The invention is not limited to the embodiments. For example, an object lens may be configured by providing two or more lenses on an optical axis.

A lens which can be used as a configuration of an object lens, for example, one or two or more selected from the group consisting of a plano-convex lens, a plano-concave lens, a biconvex lens, a biconcave lens, a concavo-convex lens, or the like is adopted.

In the endoscope or the medical instrument similar to the endoscope which includes the imaging module according to the above-described embodiments of the invention, since the imaging module having a small diameter and a low height is provided therein, it is preferably used.

What is claimed is:

1. An imaging module comprising:
an object lens;
an image-sensing device that has side surfaces and a top surface;
a holder that holds the object lens and the image-sensing device, the holder having a first butt-contact portion protruding from an inner surface of the holder such that an image side of the object lens is brought into contact with an object side of the first butt-contact portion, the holder having an inner frame formed in a shape along the side surfaces of the image-sensing device, the side surfaces of the image-sensing device being fitted into the inner frame, the holder having a second butt-contact portion protruding from the inner surface of the holder, the second butt-contact portion being brought into contact with the top surface of the image-sensing device in a direction in which the image-sensing device is inserted into the inner frame; and
an aperture stop arranged closer to the object than the first butt-contact portion, wherein
an area that is to be light-shielded by an outer-periphery of the aperture stop is larger than an internal diameter of the first butt-contact portion, and wherein
between the object lens and the image-sensing device, the holder has a space in which a lens is not arranged, the space being defined by the inner surface of the holder, and between the object lens and the image-sensing device, the inner surface of the holder is inclined toward the image-sensing device or is recessed stepwise such that a cross-sectional area of the space increases toward the image-sensing device.

2. The imaging module according to claim 1, wherein the object side of the object lens has a flat surface.

3. The imaging module according to claim 1, wherein the first butt-contact portion and the second butt-contact portion are provided continuously on the inner surface of the holder and the second butt-contact portion protrudes more than the first butt-contact portion.

4. An imaging module comprising:
an object lens;
an image-sensing device that has side surfaces and a top surface; and
a holder that holds the object lens and the image-sensing device, the holder having an inner frame formed in a shape along the side surfaces of the image-sensing device, the side surfaces of the image-sensing device being fitted into the inner frame, the holder having a second butt-contact portion protruding from the inner surface of the holder, the second butt-contact portion being brought into contact with the top surface of the image-sensing device in a direction in which the image-sensing device is inserted into the inner frame, wherein
between the object lens and the image-sensing device, the holder has a space in which a lens is not arranged, the space being defined by an inner surface of the holder, and between the object lens and the image-sensing device, the inner surface of the holder is inclined toward the image-sensing device or is recessed stepwise such that a cross-sectional area of the space increases toward the image-sensing device.

5. An imaging module comprising:
an object lens;
an image-sensing device;
a lens cover having a flat surface;
a holder that holds the object lens and the image-sensing device, the holder having a first butt-contact portion protruding from an inner surface of the holder such that an image side of the object lens is brought into contact with an object side of the first butt-contact portion; and an aperture stop that is arranged closer to the object than the first butt-contact portion and has two flat surfaces, wherein an area that is to be light-shielded by an outer-periphery of the aperture stop is larger than an internal diameter of the first butt-contact portion, and wherein the object side of the object lens has a flat surface, the aperture stop is provided between the lens cover and the object lens such that the flat surface of the lens cover matches one of the flat surfaces of the aperture stop and such that the other of the flat surfaces of the aperture stop matches the flat surface of the object lens, and wherein an outer periphery of the aperture stop contacts the inner surface of the holder.

6. A method of manufacturing an imaging module, the imaging module comprising: an object lens; an image-sensing device that has side surfaces and a top surface; a holder that holds the object lens and the image-sensing device, the holder having a first butt-contact portion protruding from an inner surface of the holder such that an image side of the object lens is brought into contact with an object side of the first butt-contact portion, the holder having an inner frame formed in a shape along the side surfaces of the image-sensing device, the side surfaces of the image-sensing device being fitted into the inner frame, the holder having a second butt-contact portion protruding from the inner surface of the holder, the second butt-contact portion being brought into contact with the top surface of the image-sensing device in a direction in which the image-sensing device is inserted into the inner frame; and an aperture stop arranged closer to the object than the first butt-contact portion, wherein an area that is to be light-shielded by an outer-periphery of the aperture stop is larger than an internal diameter of the first butt-contact portion, the method comprising:

inserting a lens cover only through a portion closer to an object than the first butt-contact portion, the lens cover covering the object lens, the aperture stop, and an object side of the object lens; and inserting the image-sensing device into the inner frame such that the side surfaces of the image-sensing device are fitted into the inner frame, wherein between the object lens and the image-sensing device, the holder has a space in which a lens is not arranged, the space being defined by an inner surface of the holder, and between the object lens and the image-sensing device, the inner surface of the holder is inclined toward the image-sensing device or is recessed step-wise such that a cross-sectional area of the space increases toward the image-sensing device.

7. The method of manufacturing an imaging module according to claim 6, wherein the object side of the object lens has a flat surface.

* * * * *